3,350,329
COATING COMPOSITIONS, OF SHELLAC, MELAMINE FORMALDEHYDE, AND STYRENE-ACRYLATE EMULSIONS
Edward C. Scholl, Ramsey, N.J., assignor to Gillespie-Rogers-Pyatt Co., Inc., New York, N.Y., a corporation of Delaware
No Drawing. Filed Feb. 1, 1967, Ser. No. 613,124
10 Claims. (Cl. 260—8)

ABSTRACT OF THE DISCLOSURE

A coating composition is obtained by combining (A) an aqueous, alkaline solution of shellac combined with a melamine-formaldehyde resin reduced with water to below 60% solids content, the weight proportion of shellac to the melamine-formaldehyde resin on a solids basis being within the range of 2:1 and 1:1, wherein each ingredient and mixture of ingredients is adjusted to a pH above 10, and (B) an aqueous styrene-acrylate emulsion adjusted to a pH above 10, the weight proportion of (A) on a solids basis being from about 16% to 45% of the total weight of (A) and (B), and the final composition being adjusted to a pH above 10.

This application is a continuation-in-part of Ser. No. 434,619, filed Feb. 23, 1965, for Coating Compositions.

Background of the invention (1) *Field of the invention.*—Aqueous coatings containing shellac, an amino resin, and styrene-acrylate latexes which are especially suitable for coating paper.

(2) *Description of the prior art.*—Several prior art compositions containing shellac have been used for coating cellulose-like substrates such as paper and cloth which require low temperature curing in order to avoid scorching. The coatings generally have been deposited from a solution of the film-forming components in volatile organic solvents. These coatings have the disadvantage of the presence of volatile organic solvents which are sometimes noxious, may present a fire hazard, and are costly vehicles even when solvent recovery systems to salvage the volatile solvents allay the cost in part.

Summary

The aqueous dispersion coatings of this invention avoid the disadvantages of the organic solvent type coating compositions by using water as the volatile vehicle. This method requires that the composition possess both mechanical stability, low surface tension and low foaming characteristics. The composition must be broadly adaptable to the formation of a continuous film or protective coating. The coating may be applied to the base by usual methods of depositing on the surface thereof a thin layer of the composition and subsequently driving off the aqueous portion under the influence of heat.

Description of the preferred embodiments

This invention relates to aqueous coating compositions and to substrates coated therewith. More particularly, this invention relates to aqueous coatings containing shellac, an amino resin, and styrene-acrylate latexes, which are especially suitable for coating paper and cellulose-like substrates.

The coating compositions of the present invention are a compatible blend of (A) a product obtained by combining an aqueous, alkaline solution of shellac with an aqueous melamine-formaldehyde resin, and (B) a latex emulsion of styrene-acrylate. Thickeners may be added to give the desired viscosity. The composition is applied to a suitable substrate and preferably heated to coalesce and/or cure the coating.

Although aqueous dispersions of a shellac soap have been employed as a minor ingredient in water base coating systems, for example, as a leveling and anti-slip agent, coatings of shellac alone from aqueous solutions are lacking in durability, toughness, water-resistance and flexibility. Moreover, when such coatings are baked to improve their hardness and water resistance, they become extremely brittle. They also "yellow" badly or darken in color, when heated. Coatings made from shellac and melamine-formaldehyde resins alone under the low temperature cure conditions necessary for paper products to avoid scorching are too stiff and have insufficient grease resistance. Coatings made from the latexes alone have poor water resistance.

It has now been discovered that a combination of ingredients which, when carefully blended under the conditions specified, will give a mechanically stable composition. The compositions are heat curable using a low temperature baking cycle and fast action so that there will be no scorching of the paper. The coatings are prepared from raw materials which are non-toxic to human beings as is necessary for paper coatings which are to be used in contact with food products. The resulting films on paper are flexible and heat resistant, and at the same time have stain resistance, acid and alkali resistance, solvent resistance, and water resistance over a wide range of temperature.

It is generally known that, when two different resins or plastic materials are blended, incompatibility is the rule rather than the exception. This incompatibility can be easily recognized by the fact that films obtained from mixtures are not homogeneous, but turbid or opaque, and possess mechanical properties which are inferior to those of films obtained from the separate constituents.

In accordance with this invention shellac is mixed with water which is made alkaline by the addition of an alkaline agent, for example, borax, soda ash, sodium bicarbonate, an alkali metal hydroxide such as sodium, potassium, or lithium, ammonia, a water-soluble amine such as 2-amino-2-methyl-1-propanol, dimethylamine, triethylamine or morpholine. The pH is then adjusted to above 10. Any commercial grade of shellac such as seed lac, orange shellac, regular bone dry, and the like may be used; refined, bleached shellac is preferred because it is the lightest in color and is wax free.

The alkaline shellac solution is added to a water soluble amino-resin, particularly the water-soluble condensates of formaldehyde with an aminotriazine such as melamine, as well as alkylated formaldehyde condensates with the various compounds just named in which the alkylation is effected with methanol, or in some cases ethanol, so that the condensate is still water-soluble or easily dispersible in water. Commercial products of this type which are sold under the trade names Aerotex Resin M-3 and Parez resin 613 are especially suitable for use in this invention. Shellac is compatible with melamine-formaldehyde resins in all proportions wherein the molal ratio of formaldehyde to melamine is at least 2.5:1 and wherein the alkylating alcohol is methanol or ethanol. The pH is then adjusted to above 10.

The weight ratio of shellac solids to the melamine-formaldehyde resin solids may be varied from 2:1 to about 1:1. When greater amounts of shellac are used the product has less water resistance. The thermoplastic property of shellac is reduced by the addition of the melamine-formaldehyde resin and low time-temperature cures must be employed to avoid scorching of the paper. When shellac-melamine resin ratios of 1:3 are employed there is no cure in a reasonable time and temperature. Curing catalysts may be incorporated in the compositions to effect a more rapid curing of the melamine-formaldehyde resins, or to enable the resin to be cured at lower temperatures. Such substances are, for instance, phosphoric acid, ammonium salts of phosphoric acid, and the like. The pH of the shellac/melamine-formaldehyde composition is adjusted to above 10.

The shellac/melamine-formaldehyde composition is admixed with an aqueous latex emulsion also adjusted to a pH above 10 which contains as the disperse phase a styrene-acrylate interpolymer, especially one resulting from the copolymerization of a monomer which is a lower alkyl ester of acrylic or methacrylic acid, such as methyl acrylate, ethyl acrylate, butyl acrylate, 2-ethylhexyl acrylate, methyl methacrylate, ethyl methacrylate, butyl methacrylate, isobutyl methacrylate and the like. The preferred latex emulsions are of a styrene-ethyl acrylate copolymer, or a carboxylated styrene-ethyl acrylate copolymer, for example, the product sold under the trade names of Lytron 100, or Ubatol 7001. These have a solids content of about 45% to 50%. The pH of the final product is again adjusted, as necessary, to above 10.

Ammonia of 20% to 28% concentration (about 26° Baumé) is the preferred reagent for adjusting the pH throughout the procedure. Other alkaline agents such as 2-amino-2-methyl-1-propanol may also be used. Careful adjustment of the pH is necessary to avoid coagulation or lumping during the processing steps and to provide stability of the coating composition on storage. A pH of 10.5 is preferred. Below pH 10 the system is not stable and tends to gel with time. At pH 10 the composition has fair stability, and above pH 10.3 the composition has good stability.

The function of the latex is to change the degree of flexibility of the coating to permit it to be applied to various flexible substrates, particularly paper. Without the latex the coating is brittle. The latex becomes an integral part of the coating.

The solids concentration of the various ingredients are preferably varied only within certain limits. For maximum performance the shellac solids of the stock solution are maintained in the range of 30% to 35%. The melamine-formaldehyde resin is reduced with water to below about 60% solids content before admixing with the aqueous alkaline solution of shellac. The latex solids concentration may vary from about 45% to 50%.

Compatible proportions of the several ingredients must be used, the term "compatible" denoting compositions, films of which are clear and homogeneous after baking. Good results are obtained when the weight proportions on a solids basis of shellac and melamine-formaldehyde resin are between 2:1 and 1:1 respectively, and when the percent by weight on a solids basis of the shellac/melamine-formaldehyde product to the latex emulsion is between 16% and 45% of the total solid weight of all ingredients.

It is an advantage of this invention that the viscosity of the final composition can be adjusted to meet the customer's requirement, usually from about 20 to 1000 centipoises. Low viscosity colloidal thickeners are readily worked into the composition. The colloidal thickener must be inert to the ingredients. The preferred thickeners are cellulose derivatives such as methyl cellulose, hydroxyethyl cellulose and carboxymethyl cellulose; polyvinylpyrrolidone; starch derivatives such as carboxymethyl starch, degraded or modified starch, dextrin; various gums especially the alginates and proteins such as casein and chemically isolated soy protein. These materials may be added directly to the composition after mixing and for the most part serve not only to increase the viscosity of the composition, but also to provide a firmer adhesion of the film to the surface, thus preventing cracking and crawling. The colloidal thickener is conveniently added in the form of a 2% to 20% solution, depending on the type used.

A wax emulsion which is compatible with the above described system may be added as an optional ingredient. These are generally added for the purpose of increasing gloss. Paraffin wax emulsion is an optional ingredient which, in addition to increasing the viscosity, gives better stability and forms a protective coating with increased water resistance. It may also be added in addition to one of the above named thickeners. Polyethylene emulsions and carnauba wax emulsions can also be used.

Colloidal silica, for example, a product sold under the trade name Ludox which has a particle size of 0.1 micron, may be added as a stabilizer and release agent.

Other addition agents can be added to the composition for special purposes, for example to reduce foaming, increase the drying time, or improve the wetting of the substrate. Diethylene glycol, propylene glycol, or Carbitol (diethylene glycol monoethyl ether), in an amount up to 2.5% of the total weight will increase the drying time of the composition without affecting the gloss and smoothness of the film.

Suitable surface acting agents include the alkyl sulfates and alkyl ether sulfates, such as lauryl sulfate, lauryl ether sulfate, myristyl ether sulfate, sulfonated oils, sulfosuccinates and half esters thereof, Igepol CA 630 (polyethylene glycol p-isooctylphenyl ether), fluoro-carbon surfactants, and surfactants sold under the trade name "Surfynol," including ditertiary acetylenic glycol, dimethyl hexynol, dimethyl octyndiol, and the like. The surface acting agent is added preferably to the finished composition, and in an amount of from 0.01 to 0.05% by weight of the total weight of the formulation.

The aqueous compositions of the present invention may be pigmented, or fillers or delustrants may be introduced for special purposes. Examples of suitable pigments which may be included in an amount up to 100% by weight of the composition include titanium dioxide, carbon black, phthalocyanine blues and greens, organic maroons, and metal oxides, hydroxides, sulfides, sulfates, silicates and chromates. The proportion of such pigment or filler may be from about 1/50 of the weight of the composition to as much as 5 times the weight, depending upon the particular application desired.

The clear or pigmented dispersions or solutions may be applied to numerous other substrates besides paper, including leather, wood, glass, masonry, asbestos, ceramics, wall-covering and floor-covering materials.

The method of blending together the various ingredients in the composition is critical. Each ingredient is diluted to the proper concentration and the pH adjusted to above 10 before blending in order to have a final composition that is both stable and has the desired film properties. This can be accomplished by diluting and adjusting to a pH above 10 each named ingredient of the composition prior to mixing each of the several ingredients. Thus an aqueous, alkaline solution of shellac is combined with a melamine-formaldehyde resin reduced with water to below 60% solids content, the weight proportion of shellac to melamine-formaldehyde resin on a solids basis being within the range of 2:1 and 1:1, and the pH of each ingredient and mixture of ingredients being adjusted to a pH above 10. This composition is then admixed with an aqueous styrene-acrylate emulsion adjusted to a pH above 10, the weight proportion on a solids basis being from about 16% to 45% of the total weight of the combined composition. The pH of the final composition is finally adjusted to a pH above 10.

Rather than diluting and adjusting the pH of each ingredient before blending together to a final composition that is both stable and has the desired film properties, it has been found that all the water, and ammonia or other agent necessary to adjust the pH, can be mixed together, and the remaining ingredients then added in such a manner that at no time will the pH be less than 10. Thus all the water the formula requires is added to the ammonia, or other agent such as 2-amino-2-methyl-1-propanol which is required to adjust the pH to above 10, followed by the shellac stock solution, the melamine-formaldehyde syrup (commercial product), styrene-acrylate latex (commercial product), and finally the thickening agent, surface acting agent or any other optional ingredient, all in the order named. Example 4 gives one formula for making one quart of a finished formulation by this procedure.

The application of shellac/melamine-formaldehyde/styrene-acrylate compositions may be effected at total solids concentrations of about 10% to 50%, but is preferably carried out at about 36 to 46% by weight concentrations.

The thickness of the film can vary from 0.5 mil to 2 mils. The determining factor for film thickness is predicated upon specific requirements of the coating composition, such as grease resistance, water resistance, flexibility and the like.

The application of the coating is followed by curing at a temperature of between 300° F. and 400° F. The time of curing will vary from a time period ranging from about 10 seconds at the upper temperature to about 60 seconds at the lower temperature of the range just mentioned. A successful cure will not result below 300° F. It is desirable to use fast action at a high temperature so that there will be no scorching of the paper or cellulose-like material. The preferred temperature is about 350° F., at which temperature a cure is effected in 30 to 45 seconds depending upon the film thickness.

It is unnecessary to dry the film prior to baking. However, if the water is removed from the film before baking, the time required for an effective cure will be reduced.

The following examples are given by way of illustration and not of limitation.

EXAMPLE 1

|  | Parts by weight | Percent by weight Solids Basis |
|---|---|---|
| A. Shellac stock solution | 25.0 | 8.0 |
| Melamine-formaldehyde syrup | 9.5 | 7.6 |
| Water | 20.0 |  |
| B. Styrene-acrylate latex | 185.0 | 85.6 |

In the above formula the shellac is a refined bleached shellac; the melamine-formaldehyde resin is an 80% syrup of a methylated melamine-formaldehyde resin sold under the trade name of Parez Resin 613: the latex emulsion is a 35% styrene-65% ethyl acrylate emulsion of about 46% solids content having a pH of 8.5 to 9.5 sold under the trade name of Ubatol 7001.

The shellac stock solution is obtained by adding 3.75 pounds of refined bleached shellac to 1 gallon of water to which has been added 0.83 pound of borax, and heating at 160° F. with stirring to form a homogeneous solution. The resulting stock solution contains about 32% by weight of shellac and weighs 8.9 pounds per gallon.

The melamine-formaldehyde syrup must first be reduced with water to below 60% solids content. This may be accomplished in two ways: (1) by adding water to the melamine-formaldehyde syrup and then adding the shellac stock solution, or (2) by adding the melamine-formaldehyde syrup to the shellac stock solution and then adding water. Ingredients (A) are thoroughly admixed, and then the latex (B) is added.

The pH of each of the components, and the pH of the final composition is adjusted to above 10. The preferred reagent for adjusting the pH is ammonia solution of about 20% to 28% concentration (26° Baumé), or 2-amino-2-methyl-1-propanol.

Four parts of a paraffin wax emulsion having 40% solids content is added and a coating is obtained which has a viscosity of 20–35 centipoises at 75° F. (Brookfield Syncro-Electroviscosimeter, 20 r.p.m., #1 Spindle.)

The application rates of this composition on paper are from 2.0 pounds to 10 pounds/1000 square feet. A film coated on paper shows excellent water resistance, stain resistance and grease resistance, and has a high degree of flexibility.

The following data show the curing time for films cast on glass at 1.5 mils from the above composition.

| Temperature, ° F.: | Time, seconds |
|---|---|
| 300 | 45–60 |
| 350 | 15–45 |
| 400 | 10–30 |

These curing time temperature ratios are dependent upon the thickness of the wet film. The thinner the wet film the faster a cure is effected. If the water is removed from the film prior to curing, the time required for an effective cure may be reduced by as much as 25%.

The viscosity of the above composition may be adjusted, if necessary, to meet the requirements of the coating equipment. When 35 parts by weight of the following thickening agents are added to the above composition the resulting viscosity is:

| | Centipoises at 75° F. |
|---|---|
| 2% sodium alginate solution | 800 |
| 2% methyl cellulose solution (1500 cps.) | 320 |
| 2% methyl cellulose solution (4000 cps.) | 740 |
| 2% ethyl hydroxyethyl cellulose (high viscosity solution) | 1,040 |
| 12% casein solution—borax cut | 750 |

A Newtonian viscosity can be achieved in the above coating composition by adjusting the viscosity level with a given amount of a 15% borax cut casein solution which is prepared by the following procedure: 1200 grams of water are slurried with 200 g. of casein and mixed for 10–15 minutes at room temperature. The slurry is heated to 175° F., 30 parts by weight of borax are added, and the composition cooked for one hour at 175° F. The pH is adjusted to above 10 using ammonia solution of about 26° Baumé.

The coating composition containing the adjusted casein will have an oven stability at 125° F. for several days or longer.

EXAMPLE 2

|  | Parts by weight | Percent by weight Solids Basis |
|---|---|---|
| A. Shellac stock solution | 65 | 20.8 |
| Melamine-formaldehyde syrup | 25 | 20.0 |
| Water | 75 |  |
| B. Styrene-acrylate latex | 186 | 85.6 |
| C. 2% Sodium alginate solution | 60 |  |

The ingredients used and process details are the same as described in Example 1.

A film coated on paper shows excellent water resistance, stain resistance and grease resistance, and has a high degree of flexibility.

EXAMPLE 3

| Sample | Percent by Weight on a Wet Basis | | | |
|---|---|---|---|---|
| | I | II | III | IV |
| A. Shellac stock solution | 62.5 | 62.5 | 62.5 | 62.5 |
| Melamine-formaldehyde syrup | 25 | 25 | 25 | 25 |
| Water | 75 | 75 | 75 | 75 |
| B. Styrene-acrylate latex | 108 | 217 | 326 | 435 |
| A. Shellac stock solution | 22.2 | 14.2 | 10.5 | 8.3 |
| Melamine-formaldehyde syrup | 22.2 | 14.2 | 10.5 | 8.3 |
| B. Styrene-acrylate latex | 55.6 | 71.6 | 79.0 | 83.4 |
| Grease Resistance:[1] | | | | |
| Corn oil | No leak 8 hours | No leak 8 hours | No leak 8 hours | No leak 8 hours |
| Hydrogenated oil | Leaked | Leaked | No leak | No leak |
| Water Resistance [2] | 2.5 hours | 4 hours | 8 hours | 8 hours |

[1] The coatings were applied to kraft paper at 6 pounds per 1,000 sq. ft. with a wire wound rod. The coatings were then cured for 45 seconds at 350° F.
[2] The coated paper was folded into a boxlike container and filled with water.

The ingredients used and the process details are the same as in Example 1.

The results show that the flexibility increases as the amount of the latex is increased.

EXAMPLE 4

| | Weight in grams | Weight in grams Solids basis |
|---|---|---|
| A. Shellac stock solution | 107 | 32 |
| Melamine-formaldehyde syrup (80% solids) | 40 | 32 |
| B. Styrene-acrylate latex | 646 | 323 |
| C. Paraffin wax emulsion (40% solids) | 22 | 9 |
| Water (deionized) | 127 | |
| Ammonia (26° Baumé) | 54 | |
| Total | 996 | 396 |

In the above formula the shellac stock solution is the same as described in Example 1. The latex emulsion is a 35% styrene-65% ethyl acrylate emulsion of about 50% solids content having a pH of about 5.7, sold under the trade name of Ubatol 7005.

The ingredients are blended together by adding the ammonia to the water, followed in order by the shellac stock solution, the melamine-formaldehyde syrup, styrene acrylate latex and then the paraffin emulsion, admixing each ingredient thoroughly as it is added.

EXAMPLE 5

The ingredients and method of mixing are the same as in Example 4, but after all of the other ingredients have been mixed together, sodium lauryl sulfate is added to the mixture in an amount equal to 0.05% by weight of the total weight of the formulation.

In place of the sodium lauryl sulfate, an equivalent amount of one of the following surface active agents may likewise be employed: polyethylene glycol p-isooctylphenyl ether; ditertiary acetylenic glycol; dimethyl hexynol; dimethyl octynediol; ethoxylated acetylenic glycol; a fluoro-carbon surfactant.

While certain representative embodiments and details have been shown for the purpose of illustrating the invention, it will be apparent to those skilled in the art that various changes and modifications may be made therein without departing from the spirit or scope of the invention.

I claim:
1. A composition comprising
(A) an aqueous, alkaline solution of shellac combined with an aqueous solution of a melamine-formaldehyde resin reduced with water to below 60% solids content, the weight proportion of shellac to the melamine-formaldehyde resin on a solids basis being within the range of 2:1 and 1:1, wherein each ingredient and mixture of ingredients is adjusted to a pH above 10, admixed with
(B) an aqueous emulsion of an interpolymer resulting from the copolymerization of:
(1) a monomer which is a lower alkyl ester, or a 2-ethylhexyl ester of acrylic acid or methacrylic acid, and
(2) styrene or carboxylated styrene adjusted to a pH above 10, the weight proportion of (A) on a solids basis being from about 16% to 45% of the total weight of (A) and (B), the final composition being adjusted to a pH above 10.

2. The composition of claim 1 wherein the pH is adjusted to about 10.

3. The composition of claim 1 wherein the pH is adjusted with ammonia.

4. The composition of claim 1 wherein the pH is adjusted with 2-amino-2-methyl-1-propanol.

5. The composition of claim 1 wherein the aqueous alkaline solution of shellac is prepared by adding bleached, refined shellac to a borax solution and has a solids concentration of shellac within the range of 30% and 35%.

6. The composition of claim 1 to which has been added a thickening agent.

7. The composition of claim 1 to which has been added a surface acting agent.

8. A process for preparing the composition of claim 1 which comprises diluting and adjusting to a pH above 10 each named ingredient of the composition prior to mixing each of the several ingredients in the order named.

9. A process for preparing the composition of claim 1 which comprises mixing together all of the water with the ammonia or other agent necessary to adjust the pH of the other ingredients above pH 10, and then adding thereto each remaining ingredient in the order named, and in such a manner that at no time will the pH be less than 10.

10. As an article of manufacture, a paper having a coating thereon of a product resulting from the cure at an elevated temperature of the composition of claim 1.

No references cited.

WILLIAM H. SHORT, *Primary Examiner.*

J. NORRIS, *Assistant Examiner.*